W. BESLER.
RESILIENT WHEEL.
APPLICATION FILED JAN. 28, 1910.
987,340.
Patented Mar. 21, 1911.
2 SHEETS—SHEET 1.
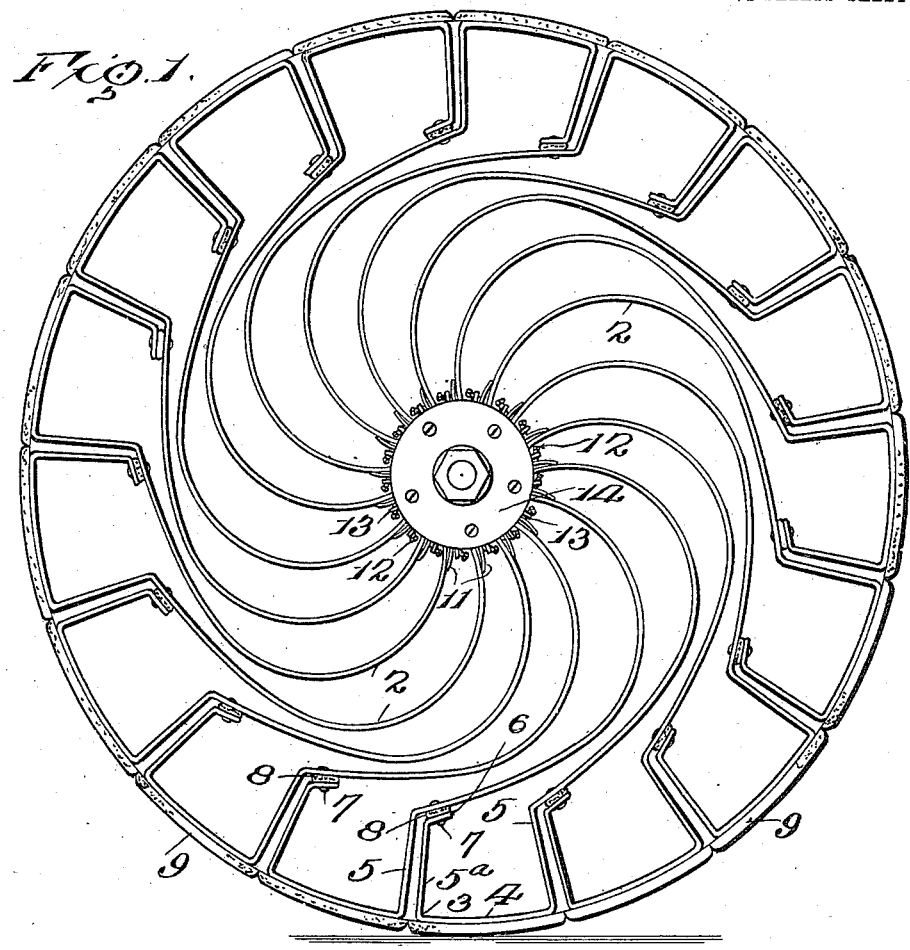
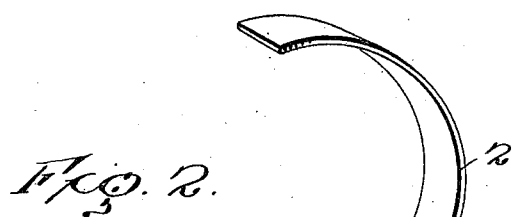
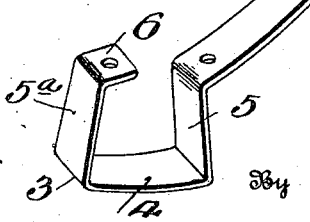

W. BESLER.
RESILIENT WHEEL.
APPLICATION FILED JAN. 28, 1910.
987,340.
Patented Mar. 21, 1911.
2 SHEETS—SHEET 2.
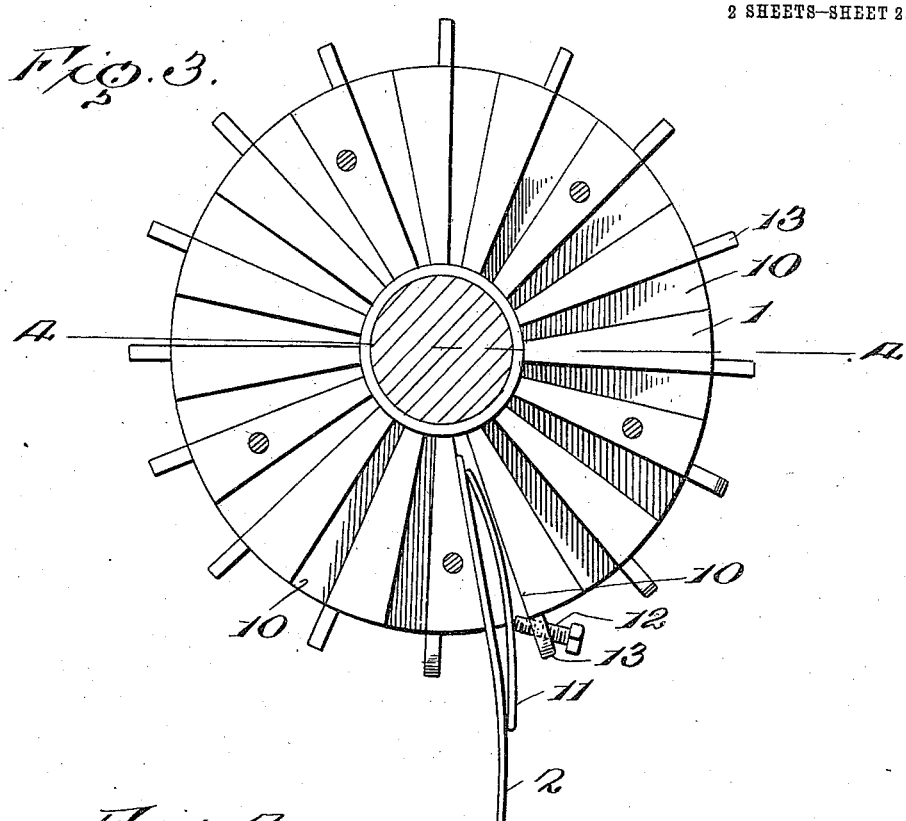
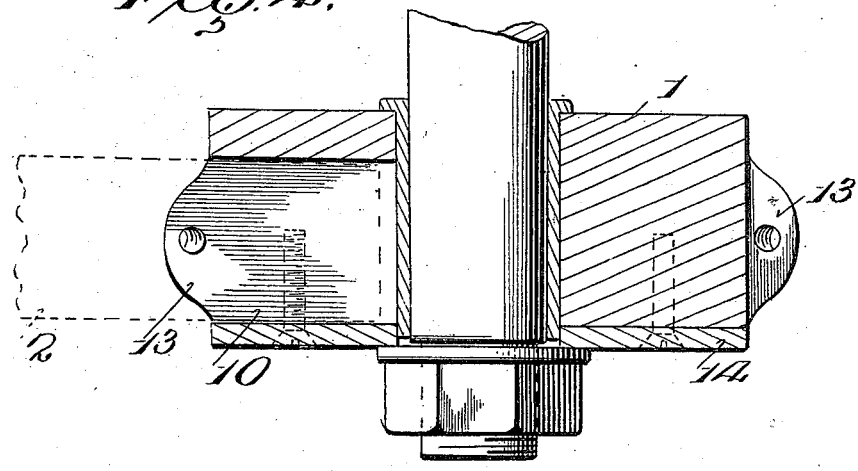
Witnesses
Inventor
W. Besler
By ........ Attorneys

UNITED STATES PATENT OFFICE.

WILLIAM BESLER, OF COLOMA, WISCONSIN.

RESILIENT WHEEL.

987,340.　　　　Specification of Letters Patent.　　Patented Mar. 21, 1911.

Application filed January 28, 1910. Serial No. 540,670.

*To all whom it may concern:*

Be it known that I, WILLIAM BESLER, a citizen of the United States, residing at Coloma Station, in the county of Waushara and State of Wisconsin, have invented certain new and useful Improvements in Resilient Wheels, of which the following is a specification.

This invention comprehends certain new and useful improvements in vehicle wheels, and the invention has for its object an improved wheel which is designed particularly for use on automobiles or the like, which possesses a maximum resiliency of structure, and which is designed to obviate the use of the customary pneumatic tire and to overcome its many disadvantages.

A further object of the invention is a spring wheel embodying a series of spring spokes which are bent at their outer ends to constitute a series of rim sections, the adjacent rim sections being detachably secured together to form a complete rim for the wheel.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing in which:

Figure 1 is a side elevation of a wheel constructed in accordance with my invention; Fig. 2 is a detail perspective view of one of the spokes detached, showing the rim section formed at the outer end thereof; Fig. 3 is an enlarged side elevation of the hub with the face plate detached, showing one of the spokes mounted in its socket; and Fig. 4 is a section on the line 4—4 of Fig. 3.

Corresponding and like parts are referred to in the following description and indicated in all the views of the drawing by the same reference characters.

Referring to the drawing, the numeral 1 designates the hub of my improved wheel, to which is attached a series of spokes 2. The spokes are all of duplicate structure and are formed of spring bars which are curved or bowed in the same circular direction and in the plane of the wheel, the adjacent spokes of the series being nested, as shown.

At their outer ends the spokes are bent to constitute a series of frame-like rim sections 3. Each rim section consists of an arcuate circumferential portion 4 and end portions 5 and $5^a$ which project inwardly from the opposite ends of the circumferential portion, and which, in the present instance, have a substantially radial disposition. The end portion 5 of each rim section is integral with the outer end of the body of the corresponding spoke, while the other end portion $5^a$ is arranged in opposed relation to the end portion 5 of the adjacent rim section, the extremity of the end portion $5^a$ being bent, as indicated at 6, to conform to the contour of the outer end of the adjacent spoke.

The adjacent ends of the rim sections are detachably connected together in any approved manner in order to constitute a complete rim for the wheel. For this purpose bolts 7 are preferably passed through the respective bent ends 6 and the outer ends of adjacent spokes, washers 8 of rubber or other suitable resilient material being interposed between the parts, whereby to maintain the rim sections in slightly spaced relation. Solid rubber tire sections 9 are applied to the peripheries of each circumferential portion 4 and are placed end to end to afford a continuous tread.

As the preferred means for detachably securing the inner ends of the spokes to the hub, I form a plurality of substantially radially disposed sockets 10 in one face of the hub, each of said sockets accommodating the inner end of one spoke. A clamping spring 11 is also seated in each socket and is interposed between the convex face of the spoke and the adjacent wall of the socket, the clamping spring being of leaf form and having a greater degree of curvature than the inner portion of the spoke, so as to bear terminally thereagainst at longitudinally spaced points. A set screw 12 bears against the outer end portion of the spring 11 at a point beyond the point of greatest curvature thereof, and thus retains the same against displacement from the socket. The set screw works in a lug 13 which outstands from the periphery of the hub for this purpose. A face plate 14 abuts against the said face of the hub and is detachably secured thereto, so as to hold the spokes and the springs against lateral displacement from the sockets. With this arrangement, it will be noted that the inner ends of the springs are seated in the sockets in such a manner as to be susceptible of yielding therein in the operation of the wheel. This method of attachment is also quite simple and admits of the parts being easily and quickly assembled.

From the foregoing description in connection with the accompanying drawing, it will be apparent that I have provided an improved spring wheel which has a maximum resiliency of structure and may be advantageously employed on automobiles or the like, to assist in absorbing the shocks incident to travel; which obviates the use of the conventional pneumatic tire and overcomes its many disadvantages; and which consists of comparatively few parts that may be easily and cheaply manufactured and readily kept in repair.

Having thus described the invention what is claimed as new is:

1. In a wheel, the combination of a hub formed with sockets, a series of spokes having the inner ends thereof received within the sockets, curved leaf springs fitted within the sockets and having a terminal engagement with the spokes, to admit of the spokes yielding in the plane of the wheel, the body portion of the spokes also having a spring action in the plane of the wheel and the outer ends of the spokes being bent to form arcuate rim portions which coöperate to form a continuous rim for the wheel.

2. In a wheel, the combination of a hub, a series of spokes projecting from the hub and having a resilient action in the plane of the wheel, the outer ends of the spokes being bent to form a series of rim sections each of which consists of an arcuate circumferential portion, and end portions extending radially and inwardly from the ends of the circumferential portion, the radial portions of adjacent rim sections being slightly spaced from each other and the outer extremity of each spoke being connected to an intermediate portion of an adjacent spoke.

3. A resilient wheel comprising a hub formed with a series of sockets opening through the periphery thereof, a rim, spokes extending between the hub and the rim and fitting loosely at their inner ends in the sockets, and curved leaf springs received in the sockets to yieldably support the spokes therein, each leaf spring bearing terminally against the corresponding spoke and bearing intermediate of its ends against the adjacent wall of the socket.

4. A vehicle wheel comprising a hub formed with a series of sockets opening through the periphery thereof, and also formed with a series of lugs outstanding from its periphery in proximity to the respective sockets, a rim, a series of spokes extending between the hub and the rim and fitting loosely at their inner ends in the sockets, curved leaf springs received in the sockets to yieldably support the spokes therein, each leaf spring bearing terminally against the inner end portion of the corresponding spoke and bearing intermediate of its ends against the adjacent wall of the socket, and set screws working in the lugs and engaging the leaf springs to hold the same against displacement from the sockets.

In testimony whereof I affix my signature in presence of two witnesses.

WILLIAM BESLER. [L. S.]

Witnesses:
L. F. BISHOP,
H. J. HAWKINS.

---

Copies of this patent may be obtained for five cents each, by addressing the "Commissioner of Patents, Washington, D. C."